US012365429B1

(12) United States Patent
Hardcastle

(10) Patent No.: US 12,365,429 B1
(45) Date of Patent: Jul. 22, 2025

(54) NOSE PLUG FOR UNDERWATER DIVING

(71) Applicant: Hardcastle Manufacturing, Mendota Heights, MN (US)

(72) Inventor: William Hardcastle, Mendota Heights, MN (US)

(73) Assignee: HARDCASTLE MANUFACTURING, Mendota Heights, MN (US)

(*) Notice: Subject to any disclaimer, the term of this patent is extended or adjusted under 35 U.S.C. 154(b) by 0 days.

(21) Appl. No.: 18/753,695

(22) Filed: Jun. 25, 2024

(51) Int. Cl.
*B63C 11/12* (2006.01)
*A62B 9/06* (2006.01)

(52) U.S. Cl.
CPC ................ *B63C 11/12* (2013.01); *A62B 9/06* (2013.01); *B63C 2011/125* (2013.01)

(58) Field of Classification Search
CPC ... B63C 11/12; B63C 11/14; B63C 2011/125; A62B 9/06; A62B 23/06; A63B 33/00
See application file for complete search history.

(56) References Cited

U.S. PATENT DOCUMENTS 2,924,217 A * 2/1960 Regel ..................... A63B 33/00 128/201.18
3,658,058 A * 4/1972 Neidhart ............... A61M 16/06 128/201.18
4,440,165 A * 4/1984 Holzel ..................... A62B 7/08 128/205.12
5,645,046 A * 7/1997 Kay ......................... A62B 9/06 128/207.14
6,008,780 A * 12/1999 Clarke .................... B63C 11/14 2/430
6,155,253 A * 12/2000 Gamberini .............. B63C 11/14 128/201.27
7,219,669 B1 * 5/2007 Lovell ............... A61M 16/0666 128/207.18
7,255,107 B1 * 8/2007 Gomez ............. A61M 16/0666 128/207.18
2004/0226566 A1 * 11/2004 Gunaratnam ..... A61M 16/0825 128/207.18

(Continued)

FOREIGN PATENT DOCUMENTS

CN 106422218 A * 2/2017
CN 108284931 A * 7/2018 ............. B63C 11/12

(Continued)

OTHER PUBLICATIONS https://www.kirbymorgan.com/products/helmets/superlite-27 (9 pages).

(Continued)

*Primary Examiner* — Kathryn E Ditmer
(74) *Attorney, Agent, or Firm* — Fishman Stewart PLLC

(57) ABSTRACT

A nose plug for performing a pressure equalization maneuver while underwater diving may include a base, a first nasal insert, and a second nasal insert. The first nasal insert and/or the second nasal insert may project from the base. The first nasal insert may fit snuggly within and may protrude deeply into a first nostril of a user when in use such that airflow through the first nostril is prevented. The second nasal insert may fit snuggly within and may protrude deeply into a second nostril of a user when in use such that airflow through the second nostril is prevented.

19 Claims, 8 Drawing Sheets

(56) References Cited

U.S. PATENT DOCUMENTS

| | | | | |
|---|---|---|---|---|
| 2005/0011524 | A1* | 1/2005 | Thomlinson ...... | A61M 16/0825 128/207.18 |
| 2005/0061325 | A1* | 3/2005 | Michaels ............... | A62B 23/06 128/205.27 |
| 2009/0044808 | A1* | 2/2009 | Guney .............. | A61M 16/0622 128/207.18 |
| 2019/0151592 | A1* | 5/2019 | Bornholdt ......... | A61M 16/0683 |
| 2024/0207559 | A1* | 6/2024 | Mencia ............. | A61M 16/0003 |

FOREIGN PATENT DOCUMENTS

| | | | | | |
|---|---|---|---|---|---|
| CN | 109572962 | A | * | 4/2019 | ............. B63C 11/12 |
| DE | 102010043688 | A1 | * | 5/2012 | ............ A61M 16/06 |
| GB | 2047545 | A | * | 12/1980 | ............. A62B 18/04 |
| KR | 20050037718 | A | * | 4/2005 | |

OTHER PUBLICATIONS https://www.amronintl.com/kirby-morgan-545-070-nose-block-device.html (2 pages, retrieved on Jun. 14, 2024).

NOAA. Under Pressure: Shrinking Styrofoam Cups in the Deep Sea. National Ocean Service website, https://oceanexplorer.noaa.gov/explorations/16carolina/logs/sep3-2/sep3-2.html#:~:text=As%20the%20cup%20descends%2C%20the,deployed%20to%20the%20deep%20sea, Sep. 3, 2016. (10 pages, retrieved on Jun. 25, 2024).

https://www.vaisala.com/en/chemical-industry-solutions/chemicals-allied-products/rubber-gloves-manufacturing-process#:~:text=Natural%20rubber%20gloves%20are%20manufactured,calcium%20nitrate%20or%20calcium%20carbonate (3 pages, retrieved on Jun. 25, 2024).

* cited by examiner

NOSE PLUG FOR UNDERWATER DIVING

TECHNICAL FIELD

The present disclosure generally relates to nose plugs that may, for example, be used in connection with underwater diving, nose clearing devices, and/or diving helmets to facilitate equalization of a diver's internal ear pressure.

BACKGROUND

When submerged in a body of water during a dive, a diver must equalize the internal fluid (e.g., air) pressure in their ears to avoid pain and injury. There are a variety of different pressure equalization maneuvers a diver may perform while submerged to accomplish this. One of these maneuvers involves the diver exhaling while plugging their mouth and nose, which results in air within the throat being pushed through the eustachian tubes and into the middle ears. This in turn equalizes and/or balances the internal fluid pressure within the diver's middle ears.

Generally, a diver is able to plug their mouth by simply using their fascial muscles to hold their mouth closed and/or press their lips together to seal the opening of their mouth. These same actions are also typically performed by a person when holding their breath for example. One of the simplest ways for a diver to plug their nose, and thus seal their nasal passage, is to manually pinch their nose with their hand and/or fingers to collapse and block their nostrils, which in turn blocks and/or seals their nasal passage. However, certain types of diving equipment (e.g., a diving helmet, a full-face diving mask, an oral-nasal mask, etc.) covers at least a portion of the diver's face and/or nose, which prevents, blocks, restricts, and/or limits access to the diver's nose. The diver is therefore unable to reach, touch, and/or manually grasp their nose with their hands and/or fingers to plug their nose, and thereby seal their nasal passage, when diving with these types of equipment. As such, divers commonly use a nose clearing device ("NCD") to assist in plugging their nose while diving.

Many current NCD designs include a nose block, pad, or other body that is arranged within the diving helmet and is pressed directly against the diver's nose to cover and/or block the nostril openings. It can be challenging to properly position the nose block relative to the nose so that it sufficiently contacts the nose to create an effective seal. In addition, the nose block often needs to be pressed against the nose with a large amount of force to achieve and maintain an effective seal while performing the equalization maneuver because the air exhaled by the user pushes against the nose block and can move the nose block partially out of contact with the nose, compromising the seal and resulting in the equalization maneuver being ineffective. Pressing the nose block against the nose with a large amount of force can be uncomfortable and painful, however, particularly during longer dives where the diver may need to perform the equalization maneuver a significant number of times.

Accordingly, there is a need for an improved nose clearing device that minimizes or eliminates one or more challenges or shortcomings of existing nose blocks for diving.

SUMMARY

A nose plug for performing a pressure equalization maneuver while underwater diving may include a base, a first nasal insert, and a second nasal insert. The first nasal insert and/or the second nasal insert may project from the base. The first nasal insert may fit snuggly within and may protrude deeply into a first nostril of a user when in use such that airflow through the first nostril is prevented. The second nasal insert may fit snuggly within and may protrude deeply into a second nostril of a user when in use such that airflow through the second nostril is prevented. A nose clearing device and/or a diving helmet may include the nose plug.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Figure 1:
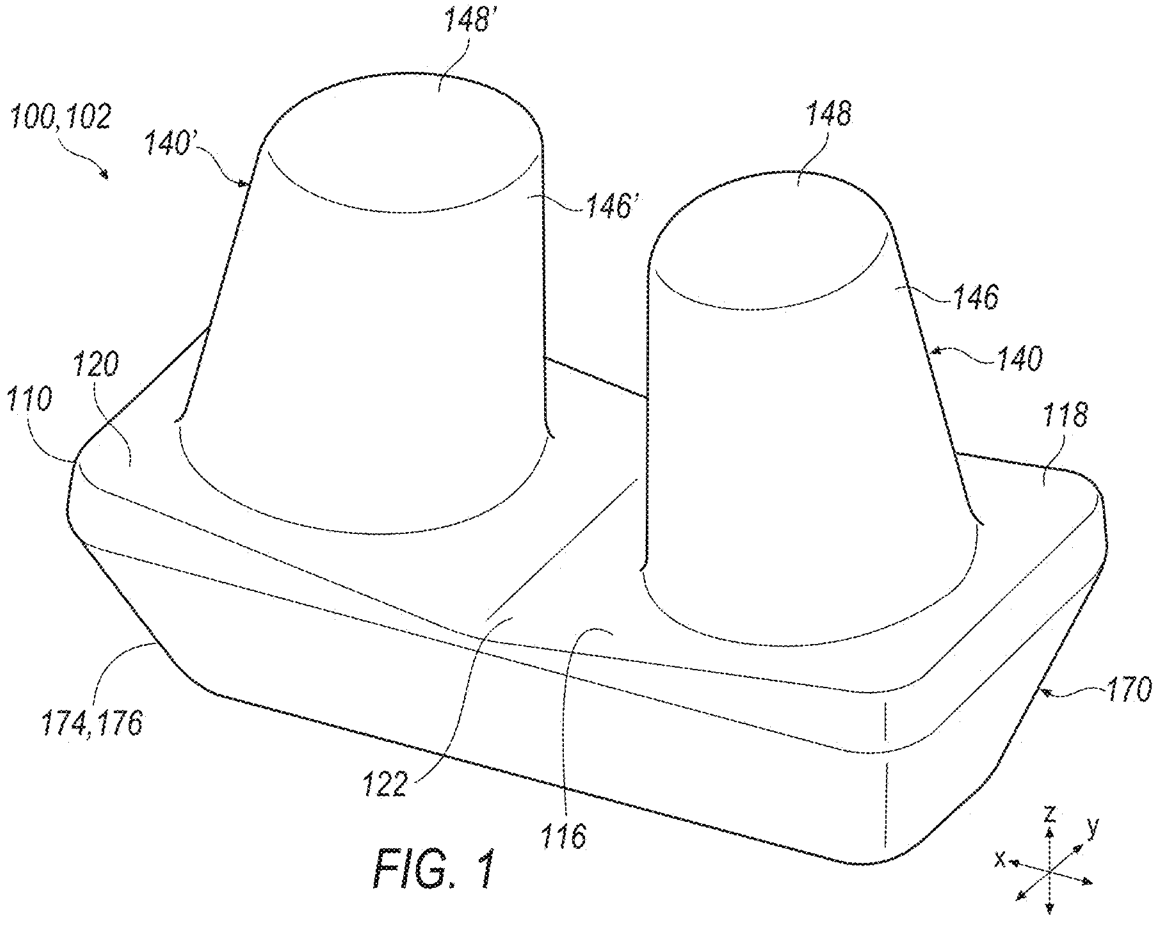
FIG. 1 is a perspective view of an exemplary nose plug.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Disclosed is a nose plug 100 for use in connection with performing a pressure equalization maneuver while underwater diving. A diver may use the nose plug 100 to plug their nose to block and/or seal their nasal passage while performing an equalization maneuver to equalize their internal ear pressure during an underwater dive. The nose plug 100 is easy to properly position relative to the nose and provides an effective sealing and/or blockage of the nasal passage with less difficulty, effort, and discomfort than conventional NCDs. Compared to conventional NCDs, the disclosed nose plug 100 enables divers to more easily, quickly, comfortably, and effectively plug their nose while underwater diving, such as when performing a pressure equalization maneuver.

In examples, the nose plug 100 is structured as and/or part of a nose plug attachment 102 that is releasably attachable to a separate nose clearing device 20 ("NCD"), such as an existing NCD 20 owned by the diver and/or an NCD 20 that is part of, included with, and/or attachable to a diving helmet 10. For example, in FIGS. 1-5B, the nose plug attachment 102 is attachable to and/or mountable on the nose block 22 of an NCD 20 (e.g., via stretching and/or wrapping at least a portion of the nose plug 100, such as the skirt 180, around at least a portion of the nose block 22). In other examples, the nose block 22 of an existing NCD 20 may be removed and replaced by the nose plug attachment 102, which is attachable (e.g., directly) to the mounting shaft 24 of the NCD 20 (e.g., via a mechanical connection, such as a screwed or detent connection, formed by a recess receiving and engaging an end of the mounting shaft 24). The nose plug attachment 102 may be used in connection with (i.e., attached to) a variety of different commercially available NCDs 20 or may be specifically tailored for use in connection with one or more specific types, styles, and/or configurations of NCD 20. A diver may therefore improve, modify, and/or augment their existing NCD 20 by simply connecting the nose plug attachment 102 to their existing NCD 20 and/or a portion thereof. Alternatively, the nose plug 100 is structured as a non-removable portion of and/or forms the nose block 22 of an NCD 20 as generally illustrated in FIG. 6.

An NCD 20 including the nose plug 100, as well as a diving helmet 10 including the nose plug 100 and/or the NCD 20 that includes the nose plug 100, is contemplated and encompassed within the instant disclosure.

Figure 6:
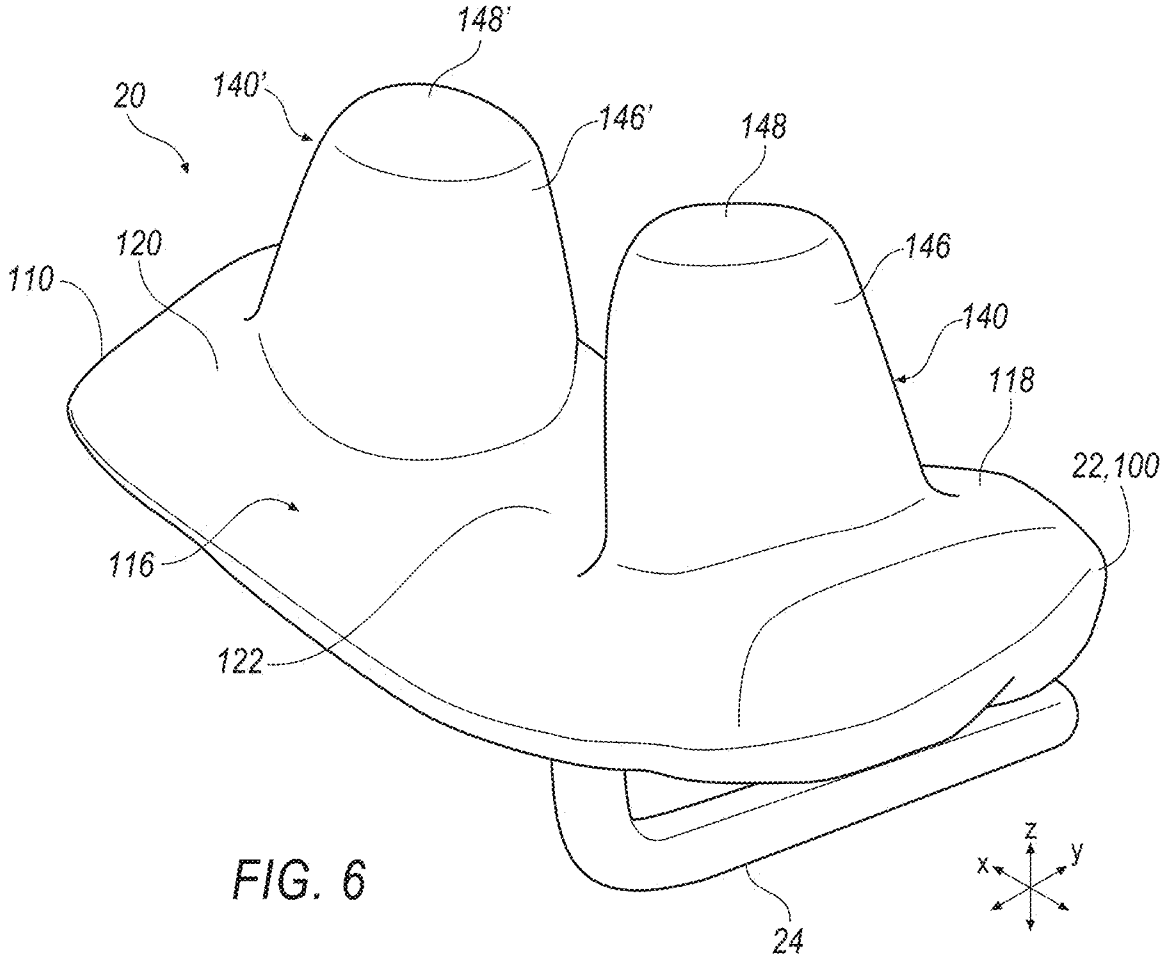
FIG. 6 is a perspective view of an exemplary nose clearing device including a nose plug.
Figure 7:
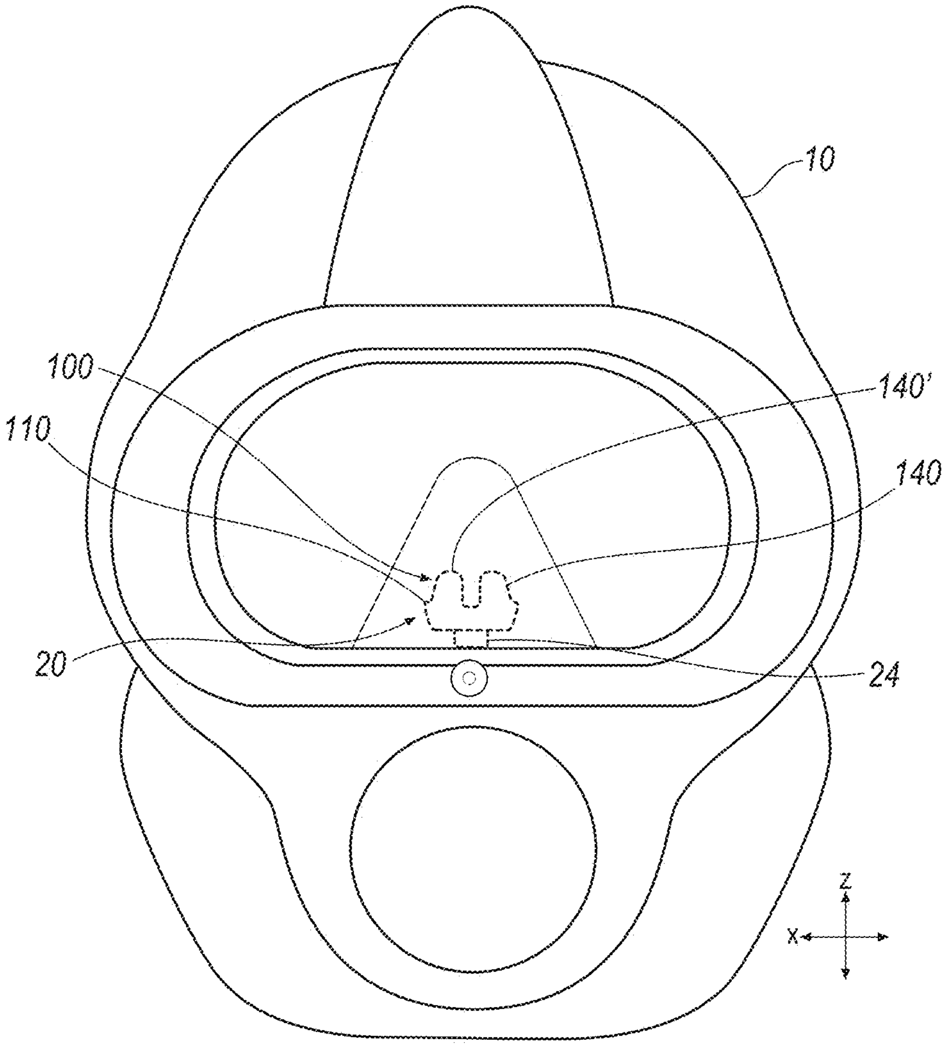
FIG. 7 is a front view of an exemplary diving mask including a nose clearing device and a nose plug.

The nose plug 100 is configured to be arranged within a piece of diving equipment, such as a diving helmet 10, and is inaccessible by a diver's hand during a dive (i.e., while wearing the diving helmet 10). The nose plug 100 is connectable to a mating component (e.g., a nose clearing device 20, an adapter, a sealing device) of a piece of diving equipment (e.g., a diving helmet 10). The nose plug 100 is connectable to and/or a portion of a nose clearing device 20 ("NCD") that is attachable to and positioned within a diving helmet 10 during use as generally illustrated in FIG. 7. The NCD 20 includes a nose block 22, pad, or other body that is arranged within the diving helmet 10 and is pressed to a diver's nose to cover and/or block the nostrils and, thus, seal the nasal passage. The NCD 20 includes a mounting shaft 24, rod, bar, or other member that connects the nose block 22 to the diving helmet 10. The nose block 22 is connected to and/or mounted on a first end of the mounting shaft 24, and a second, opposite end of the mounting shaft 24 is connected to the diving helmet 10 (e.g., via one or more other mating components of the diving helmet 10, such as an adjusting mechanism, adapter, and/or sealing device). Optionally, the nose plug 100 is structured as and/or part of a nose plug attachment 102 that is connected to and/or mounted on the NCD 20. The nose plug attachment 102 is connectable to and/or mountable on the nose block 22 of the NCD 20 in some examples (see, e.g., FIGS. 1-5B), and, in other examples, the nose block 22 is removed from the mounting shaft 24 and replaced by the nose plug attachment 102, which is attached (e.g., directly) to the second end of the mounting shaft 24. Alternatively, the nose plug 100 is structured as a non-removable portion of and/or forms the nose block 22 of the NCD 20 (see, e.g., FIG. 6). A diver is able to move, adjust, and/or position the nose plug 100 within the diving helmet 10 relative to their nose by manipulating (e.g., with their hand) an adjusting mechanism (e.g., a knob) that is disposed on an external surface of the diving helmet 10. The adjusting mechanism is connected (e.g., directly or indirectly) to the second end of the mounting shaft 24. In this way the diver is able to move the nose plug 100 to their nose and insert the nasal inserts 140, 140' of the nose plug 100 deep into their nostrils to cover, block, and/or seal their nostrils and, thereby, seal their nasal passage. With their nose now plugged by the nose plug 100, the diver can perform a pressure equalization maneuver to equalize the internal fluid pressure in their ears. Once the equalization maneuver has been successfully performed, the diver can then manipulate the adjusting mechanism to move the nose plug 100 away from their nose to remove the nasal inserts 140, 140' from of their nostrils.

As generally illustrated in FIGS. 1-6, the nose plug 100 includes a base 110 and a plurality of nasal inserts (e.g., a first nasal insert 140 and a second nasal insert 140'). The nasal inserts 140, 140' are solid bodies disposed on and projecting from an external surface (e.g., an upper surface 116) of the base 110. The nasal inserts 140, 140' each fit snuggly within and protrude deeply into a respective nostril during use. The nasal inserts 140, 140' at least partially fill the respective nostril, and sealingly contact, abut, and/or press against one or more surfaces of the user's nose to effectively cover, block, and/or seal the user's nostrils, thereby sealing and/or blocking the user's nasal passage. The nasal inserts 140, 140' each contact, abut, and/or press against a substantial amount of the surface within the respective nostril and/or the surface around the opening of the nostril when the nose plug 100 is in use. The area of surface contact achieved between the nose plug 100 and the user's nose is significantly larger than the area of surface contact achieved by conventional NCDs 20 in which the nose block 22 of the NCD 20 is pressed directly against a bottom/lower surface of the nose and does not penetrate into the nostrils. The nose plug 100 therefore achieves a stronger and/or improved sealing of the nostrils, and consequently the nasal passage, than is achieved with a conventional NCD 20. The larger area of surface contact also enables the nose plug 100 to be pressed against and/or into the nose with less force to achieve and maintain an effective seal (e.g., relative to a conventional NCD 20) as the nose plug 100 provides more resistance to the removal forces applied by the air that the user exhales during the equalization maneuver (e.g., due to an increased amount of friction between the nose plug 100 and the surfaces of the nose). The arrangement of the nasal inserts 140, 140' within the nostrils also restricts and/or limits movement of the nose plug 100 relative to the nose making the nose plug 100 easier and more comfortable to use. For example, movement of the nose plug 100 in the X-direction and the Y-direction is restricted by the normal force between the nasal inserts 140, 140' and the nose whereas conventional NCDs 20 rely on the nose block 22 being pressed against the nose in the Z-direction with sufficient force to resist movement in the X-direction and/or Y-direction. The nasal inserts 140, 140' are shaped, arranged, and oriented in a complimentary manner to the nostrils of the user and are insertable into the nostrils of the user simultaneously. As a result, a user is able to quickly, easily, and comfortably position and orient the nose plug 100 relative to their nose so that an effective seal and/or blockage of the nasal passage is achieved during use.

The base 110 and the nasal inserts 140, 140' are integrally formed with and/or connected to one another (e.g., via molding) such that nose plug 100 is a monolithic component. Conceivably, the base 110 and the nasal inserts 140, 140' may be separate and/or individual components that are connected to one another to, for example, enable the nasal inserts 140, 140' to be detached and replaced (e.g., with a new nasal insert and/or a nasal insert of a different size).

The nose plug 100 and the portions, elements, and/or components thereof (e.g., the base 110, the nasal inserts 140, 140', the deformable skirt 174) is composed of a skin safe and stretchable (e.g., elastically deformable) material. The material of the nose plug 100 is also non-porous (i.e., a non-porous material) and resistant to changes in size, shape, and/or density due to the forces present in an underwater and/or diving environment. In contrast, porous materials (e.g., foam) may compress, collapse, and/or shirk due to the increased forces and/or pressures present in underwater and/or diving environments (e.g., at greater depths). Non-porous materials are thus typically preferable to porous materials due to their ability to maintain their general size, shape, and density when subjected to the forces of the underwater and/or diving environment. The material of the nose plug 100 is also generally a soft rubber material to enhance user comfort. In other words, the nose plug 100 and the portions, elements, and/or components thereof (e.g., the base 110, the nasal inserts 140, 140', the deformable skirt 174) is composed of a skin safe, elastically deformable (e.g., stretchable), non-porous, soft rubber material that is capable of withstanding the forces of an underwater and/or diving environment without significant impact and/or influence on its size, shape, and/or density, such as silicone, nitrile, latex, and/or other suitable material.

As generally illustrated in FIGS. 1-6, the base 110 is a body, support structure, and/or platform that supports the nasal inserts 140, 140'. The base 110 also maintains the arrangement and orientation of the nasal inserts 140, 140' relative to one another. The nose plug 100 and/or the base 110 is connectable to a piece of diving equipment (e.g., a diving helmet 10), such as via a mating component (e.g., an NCD 20, an adapter, a sealing device) of the diving equipment. For instance, in some examples, the base 110 is connected to an NCD 20 (e.g., a mating component of the diving helmet 10), which is releasably connected to the diving helmet 10. In other examples, such as in FIG. 6, the base 110 is part of the NCD 20 that is connectable to a mating component, such as an adapter, sealing mechanism, and/or adjustment mechanism, of the diving helmet 10.

The base 110 has and/or defines a "V" shape profile (see, e.g., FIG. 2) and/or an arc shape profile (see, e.g., FIG. 6) when viewed in a transverse or Y-direction. As generally illustrated in FIG. 3, the base 110 has and/or defines a generally rectangular shape when viewed in a vertical or Z-direction. The base 110 has a length $L_b$ extending in a horizontal or X-direction and a width $W_b$ extending in the Y-direction. The length $L_b$ is 1.5 to 2.0 inches (preferably, 1.75 inches) and the width $W_b$ is 0.5 to 1.5 inches (preferably, 0.9 inches). The corners of the base 110, which are each disposed between a width side surface and an adjacent length side surface of the base 110, are rounded and have a radius of curvature $R_c$ of 0.10 to 0.15 inches (preferably, 0.13 inches). The base 110 has a centerline 112 extending in the Y-direction and disposed in a center of the base 110 relative to the X-direction (i.e., disposed equidistant from the two width side surfaces). Optionally, the portions of the nose plug 100 disposed on opposite sides of a Y-Z plane extending along the centerline 112 are mirror images of one another.

Figure 2:
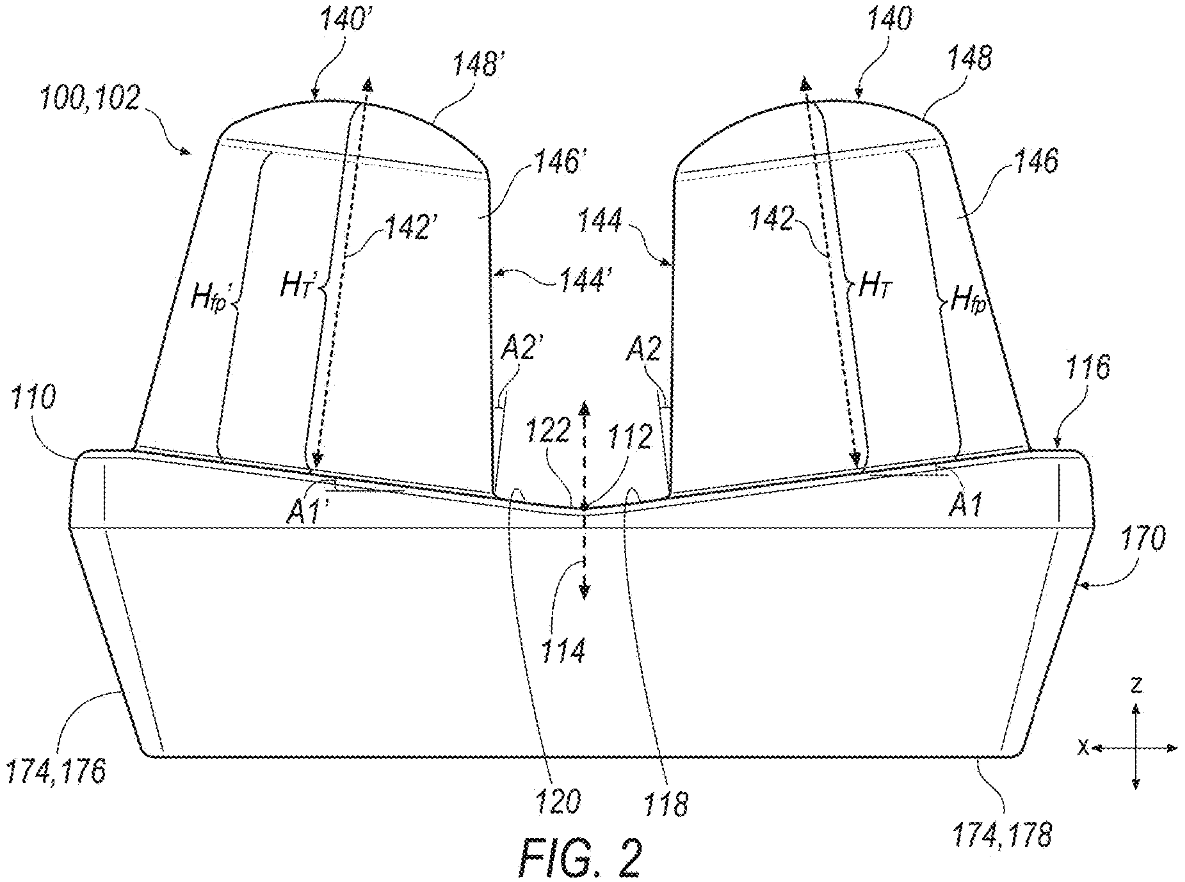
FIG. 2 is a front view of the exemplary nose plug of FIG. 1.
Figure 3:
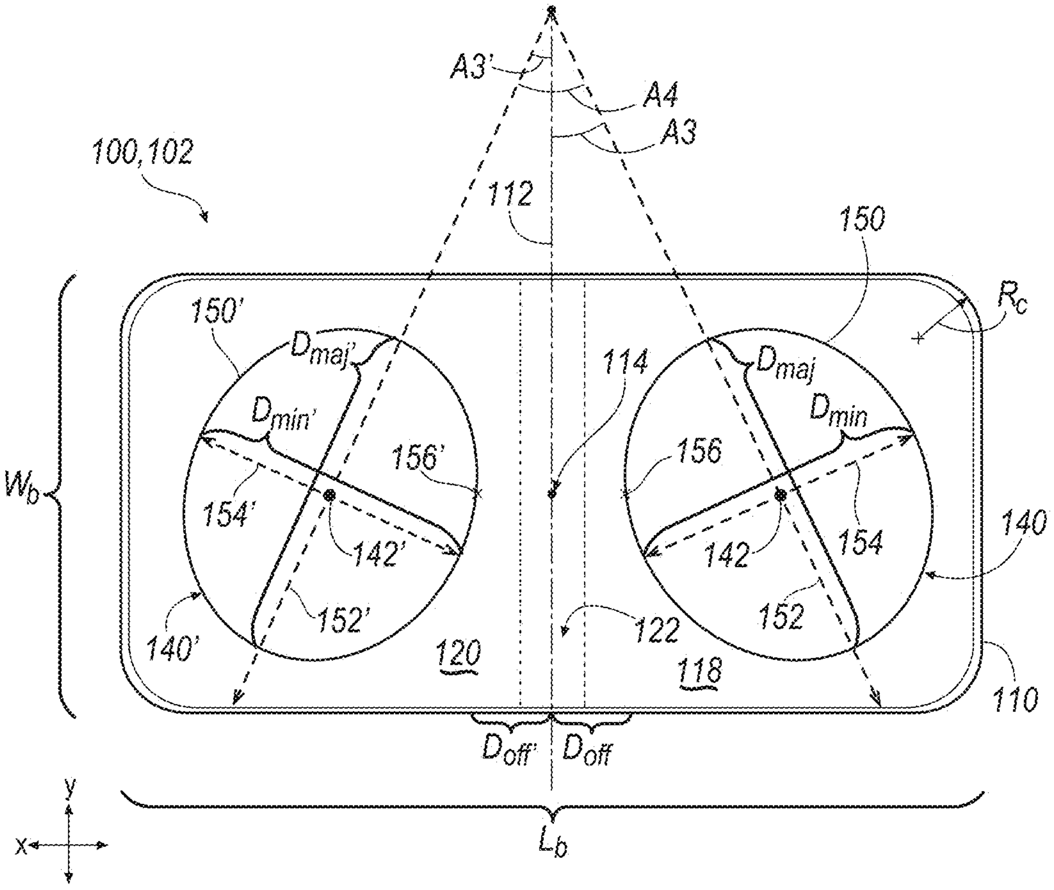
FIG. 3 is a top-down view of the exemplary nose plug of FIG. 1 showing a cross-section through each of the nasal inserts.

As generally illustrated in FIGS. 1-6, the base 110 includes one or more external surfaces. The nasal inserts 140, 140' are disposed on and project from an external surface 116 of the base 110 that faces toward the user's nose when the nose plug 100 is in use, which may be considered and/or referred to as an upper surface 116. In some instances, the upper surface 116 may contact, abut, and/or press against one or more surfaces of the user's nose during use of the nose plug 100 (e.g., when the first nasal insert 140 is disposed in the first nostril and the second nasal insert 140' is disposed in the second nostril). As such, the upper surface 116 may also be considered and/or referred to as a contact surface. The upper surface 116 of the base 110 has and/or defines a V-shaped and/or a U-shaped cross-sectional profile as generally shown in FIG. 2.

As generally illustrated in FIGS. 1-3, 5B, and 6, the upper surface 116 includes a first angled region 118, a second angled region 120, and an optional transition region 122. The first and second angled regions 118, 120 extend transversely to one another and are each angled and/or sloped downwardly toward the centerline 112 of the base 110 and/or the transition region 122. The first and second angled regions 118, 120 each extend at an angle A1, A1' of 5°-10° (preferably, 8°) relative to an X-Y plane as illustrated in FIG. 2. In other words, an angle of 150°-170° (preferably, 164°) is defined by and between the first angled region 118 and the second angled region 120 of the upper surface 116. The transition region 122 is defined by a curved area and/or portion of the upper surface 116 disposed at or about a central region of the base 110. The transition region 122 extends along and/or parallel to the centerline 112 of the base 110 in the Y-direction. The transition region 122 also extends between and connects the first and second angled regions 118, 120 (e.g., generally in the X-direction). Alternatively, the upper surface 116 may not include a transition region 122 and the first and second angled regions 118, 120 may meet, contact, and/or intersect one another at a sharp angle (e.g., at the centerline 112 of the base 110). The first angled region 118, the second angled region 120, and the transition region 122 collectively define and/or form the V-shaped and/or U-shaped cross-sectional profile of the upper surface 116.

As generally illustrated in FIGS. 1-6, the nose plug 100 includes a first nasal insert 140 and a second nasal insert 140'. The nasal inserts 140, 140' are solid, non-hollow bodies (e.g., completely solid bodies) and are not able to be flowed through by air (e.g., do not have, include, and/or define an air channel; are free of one or more through passages). The first nasal insert 140 is insertable into and fits snuggly within a first nostril of the user and the second nasal insert 140' is insertable into and fits snuggly within a second nostril of the user. When the nose plug 100 is in use, the first nasal insert 140 protrudes deeply into the first nostril, at least partially fills the first nostril, and sealingly contacts, abuts, and/or presses against a substantial amount of the surface of the nose within and/or defining the first nostril and/or the surface of the nose around the opening of the first nostril. The second nasal insert 140' protrudes deeply into the second nostril, at least partially fills the second nostril, and sealingly contacts, abuts, and/or presses against a substantial amount of the surface of the nose within and/or defining the second nostril and/or the surface of the nose around the opening of the second nostril. In this manner, the nasal inserts 140, 140' block and/or seal the user's nostrils in an airtight manner and prevent airflow (i.e., the flow of air) through the first and second nostrils when the nose plug 100 is in use. The shape, arrangement, and orientation of the nasal inserts 140, 140' correspond to, match, mimic, and/or follow the natural shape, arrangement, and orientation of the nostrils thereby providing enhanced and/or improved user comfort (e.g., due at least in part to minimal deformation and/or stretching of the user's nose by the nasal inserts 140, 140').

The nasal inserts 140, 140' are disposed on and project from an external surface (e.g., an upper surface 116) of the base 110. The first nasal insert 140 is disposed on and projects from the first angled region 118 of the upper surface 116 of the base 110. The second nasal insert 140' is disposed on and projects from the second angled region 120 of the upper surface 116 of the base 110. The first nasal insert 140 and the second nasal insert 140' are mirror images of one another relative to the centerline 112 of the base 110 and/or a Y-Z plane extending along the centerline 112, and are therefore structured and arranged in a substantially similar manner.

The first nasal insert 140 is disposed on and projects from the first angled region 118 of the upper surface 116 of the base 110. The first nasal insert 140 has a central longitudinal axis 142 that extends generally perpendicular to the first angled region 118 of the upper surface 116 of the base 110. Due to the angle of the first and second angled regions 118, 120, an angle of 10°-20° (preferably, 16°) is defined by and between the central longitudinal axis 142 of the first nasal insert 140 and the central longitudinal axis 142' of the second nasal insert 140'. The first nasal insert 140 has a first/wide axial end that is disposed on, contacts, and/or is connected to the base 110. The first nasal insert 140 also has an opposite, second/narrow/free axial end that is disposed spaced apart from the base 110. One or more radial dimensions of the first nasal insert 140 (e.g., a radial dimension along the major axis 152 and/or a radial dimension along the minor axis 154) is greater at the first axial end than at the second axial end. An outer circumferential surface 144 of the first nasal insert 140 tapers radially inwardly toward the central axis 142 of the first nasal insert 140 as the outer circumferential surface 144 extends from the first axial end toward the second axial end of the first nasal insert 140. The outer circumferential surface 144 extends at an angle A2 of 5°-15° (preferably, 9°) relative to the central axis 142 of the first nasal insert 140 (see, e.g., FIG. 2). In other words, the angle A2 of 5°-15° (preferably, 9°) is defined by and between the outer circumferential surface 144 and the central axis 142. In at least some examples, the angle A2 is substantially equal to or slightly greater than the angle A1 defined between the first angled region 118 and the horizontal plane. This ensures that the gap between the nasal inserts 140, 140' is not narrower at the free ends of the nasal inserts 140, 140' than at the base 110, which can result in the nasal inserts 140, 140' pinching the septum of the nose causing discomfort.

The first nasal insert 140 includes (i) a frustoconical and/or truncated cone shaped portion 146 and (ii) a rounded and/or dome shaped portion 148. The frustoconical portion 146 is disposed on, contacts, and/or is connected to the base 110 (e.g., the first angled region 118 of the upper surface 116). The dome portion 148 is disposed at and/or connected to an end of the frustoconical portion 146 opposite the base 110. The rounded design of the dome portion 148 provides enhanced user comfort as there are fewer sharp edges and/or corners that can cause discomfort, particularly when touching, contacting, and/or pressing against the sensitive internal surface of the nose deep within the nostril. A height $H_{fp}$ or longitudinal dimension of the frustoconical portion 146, which extends parallel to the central axis 142 of the first nasal insert 140 from the base 110 to the dome portion 148, is 0.40 to 0.60 inches (preferably, 0.52 inches). A height or longitudinal dimension of the dome portion 148 is 0.01 to 0.1 inches (preferably, 0.025 inches). A total height $H_T$ of the first nasal insert 140 (e.g., from the wide end of the frustoconical portion 146 to the tip of the dome portion 148) is 0.41 to 0.7 inches (preferably, 0.425 to 0.625 inches; more preferably, 0.545 inches). In some examples, the first nasal insert projects at least 0.1 inches (e.g., at least 0.2 inches; 0.25 to 0.5 inches) into the first nostril when the nose plug 100 is in use to ensure a large contact surface area is established between the first nasal insert 140 and the surfaces within and/or defining the first nostril and that an airtight seal is achieved. The aforementioned heights $H_{fp}$, $H_T$ allows the first nasal insert 140 to project far enough into the first nostril to prevent accidental removal from the first nostril and to form a tight seal of the first nostril during use, while also not projecting far enough into the first nostril to cause user discomfort. The outer circumferential surface 144 of the first nasal insert 140 is defined and/or formed entirely by the frustoconical portion 146, though this is not required.

As generally illustrated in FIG. 3, the first nasal insert 140, the frustoconical portion 146, and/or the dome portion 148 thereof has an ellipse shaped cross-section 150 defined in a plane perpendicular to the central axis 142 of the first nasal insert 140. The ellipse shaped cross-section 150 corresponds to and/or mimics the typical natural shape of the first nostril. As a result, the first nasal insert 140 deforms and/or stretches the user's nose to a lesser extent during use (e.g., relative to a nasal insert with a circular, rectangular, or triangular cross-sectional shape for example), which enhances user comfort. The ellipse shaped cross-section 150, in conjunction with the tapering and/or narrowing of the first nasal insert 140, also enables the first nasal insert 140 to be utilized with and/or to better accommodate different nostril shapes and nostril sizes.

The ellipse shaped cross-section 150 has a major axis 152 and a minor axis 154. The major axis 152 extends diametrically across the ellipse 150 between the two vertices of the ellipse 150 that are disposed furthest from one another. The minor axis 154 extends diametrically across the ellipse 150 between the two vertices of the ellipse 150 that are disposed closest to one another. The major axis 152 and the minor axis 154 extend perpendicularly to one another. The first nasal insert 140 is arranged on the first angled region 118 of the upper surface 116 such that the major axis 152 extends at an angle A3 of 20°-30° (preferably, 25°) relative to the centerline 112. In other words, the angle A3 of 20°-30° (preferably, 25°) is defined between the major axis 152 and the centerline 112 of the base 110. The major axis 152 of the first nasal insert 140 and the major axis 152' of the second nasal insert 140' extend transversely relative to one another and intersect the centerline 112 on the same side of the base 110. The major axes 152, 152' of the nasal inserts 140, 140' intersect each other at a 40°-60° (preferably, 50°) angle A4. This arrangement enhances user comfort and facilitates effective sealing of the nostrils as the orientation of the nasal inserts 140, 140' relative to one another corresponds to and/or mimics the typical natural orientation of the first and second nostrils relative to one another.

At the first end of the first nasal insert 140, a diameter $D_{maj}$ of the first nasal insert 140 along the major axis 152, which may be referred to as the major diameter $D_{maj}$, is 0.5 to 0.8 inches and a diameter $D_{min}$ of the first nasal insert 140 along the minor axis 154, which may be referred to as the minor diameter $D_{min}$, is 0.4 to 0.7 inches. The aforementioned diameters $D_{maj}$, $D_{min}$ overlap, encompass, correspond to, and/or generally correspond to the dimensions of an average nostril and/or nostril opening. The diameters $D_{maj}$, $D_{min}$ may also be slightly larger than the dimensions of an average nostril and/or nostril opening to ensure a snug fit of the first nasal insert 140 within the first nostril. This enables the first nasal insert 140 to sufficiently contact the surface(s)

of the nose to seal the first nostril with a minimal amount of deformation and/or stretching of the user's nose. If the major and minor diameter $D_{maj}$, $D_{min}$ of the first nasal insert 140 are too small, the first nasal insert 140 may be unable to sufficiently contact the surface(s) of the nose to completely block and/or seal the first nostril. If the major and minor diameter $D_{maj}$, $D_{min}$ of the first nasal insert 140 are too large, the first nasal insert 140 may cause an unnecessarily large amount of deformation and/or stretching of the user's nose during use and cause discomfort.

A proximal point 156 of the first nasal insert 140 that is disposed closest to the centerline 112, a central vertical and/or Z-direction axis 114 of the base 110, and the central axis 142 of the first nasal insert 140 are aligned with one another in the X-direction. The first nasal insert 140 is disposed on the first angled region 118 a distance $D_{off}$ of 0.1 to 0.2 inches (preferably, 0.12 to 0.17 inches) from the centerline 112 of the base 110 in the X-direction, which may also be referred to as an offset distance $D_{off}$. More specifically, the offset distance $D_{off}$ is defined between the proximal point 156 of the first nasal insert 140 and the central vertical axis 113 of the base 110. This arrangement enhances user comfort and facilitates effective sealing of the nostrils as the relative arrangement of and distance between the nasal inserts 140, 140' corresponds to and/or mimics the typical relative arrangement of and distance between the first and second nostrils.

The second nasal insert 140' is disposed on and projects from the second angled region 120 of the upper surface 116 of the base 110. The first nasal insert 140 and the second nasal insert 140' are mirror images of one another relative to the centerline 112 of the base 110 and/or a Y-Z plane extending along the centerline 112. As such, the second nasal insert 140' is configured in a substantially similar manner as the previously described first nasal insert 140. The arrangement of the second nasal insert 140' relative to the base 110, the centerline 112, and/or the second angled region 120 of the upper surface 116 is also substantially similar to the arrangement of the first nasal insert 140 relative to the base 110, the centerline 112, and/or the first angled region 118 of the upper surface 116. The second nasal insert 140' includes central longitudinal axis 142', an outer circumferential surface 144', a frustoconical portion 146', a dome portion 148', a frustoconical portion height $H_{fp}'$, a total height $H_T'$, an ellipse shaped cross-section 150', a major axis 152', a minor axis 154', a proximal point 156', an angle A2', an angle A3', a major diameter $D_{maj}'$, a minor diameter $D_{min}'$, and an offset distance $D_{off}'$ that are structured and arranged in a substantially similar manner as the corresponding portions of the first nasal insert 140. The portions, elements, and/or features of the second nasal insert 140' are not described in further detail for brevity.

The size and/or dimensions of the nose plug 100 may be tailored based on the size of the intended user to provide optimal comfort and effectiveness. For example, the nose plug 100 may be provided in several different sizes such as a small, medium, and large size. The dimensions of the nasal inserts 140, 140' of a size small nose plug 100 and a size medium nose plug 100 are approximately 80% and 90%, respectively, of the dimensions of a large size nose plug 100. For example, the nasal inserts 140, 140' of a size large nose plug 100 have a major diameter $D_{maj}$, $D_{maj}'$ of 0.7 inches, a minor diameter $D_{min}$, $D_{min}'$ of 0.6 inches, an offset distance $D_{off}$, $D_{off}'$ of 0.16 inches, a frustoconical portion height $H_{fp}$, $H_{fp}'$ of 0.52 inches, a dome portion height of 0.025 inches, and/or a total height $H_T$, $H_T'$ of 0.545 inches. The nasal inserts 140, 140' of a size medium nose plug 100 have a major diameter $D_{maj}$, $D_{maj}'$ of 0.63 inches, a minor diameter $D_{min}$, $D_{min}'$ of 0.54 inches, an offset distance $D_{off}$, $D_{off}'$ of 0.144 inches, a frustoconical portion height $H_{fp}$, $H_{fp}'$ of 0.468 inches, a dome portion height of 0.022 inches, and/or a total height $H_T$, $H_T'$ of 0.490 inches. The nasal inserts 140, 140' of a size small nose plug 100 have a major diameter $D_{maj}$, $D_{maj}'$ of 0.56 inches, a minor diameter $D_{min}$, $D_{min}'$ of 0.48 inches, an offset distance $D_{off}$, $D_{off}'$ of 0.128 inches, a frustoconical portion height Hip, Hip' of 0.416 inches, a dome portion height of 0.02 inches, and/or a total height $H_T$, $H_T'$ of 0.436 inches. The dimensions of the base 110 are the same regardless of the size (i.e., small, medium, large) of the nose plug 100.

Optionally, the nose plug 100 and/or the base 110 includes one or more attachment formations 170 via which the nose plug 100 is attachable to and/or mountable on an NCD 20. The nose plug 100 includes one or more attachment formations 170 at least when the nose plug 100 is configured as a nose plug attachment 102. The attachment formation 170 is configured to engage one or more portions of the NCD 20 to attach, connect, and/or mount the nose plug attachment 102 to the NCD 20. For example, the attachment formation 170 may engage the nose block 22 of an NCD 20 (see, e.g., FIGS. 1-5B) and/or the mounting shaft 24 of an NCD 20.

Figure 4:
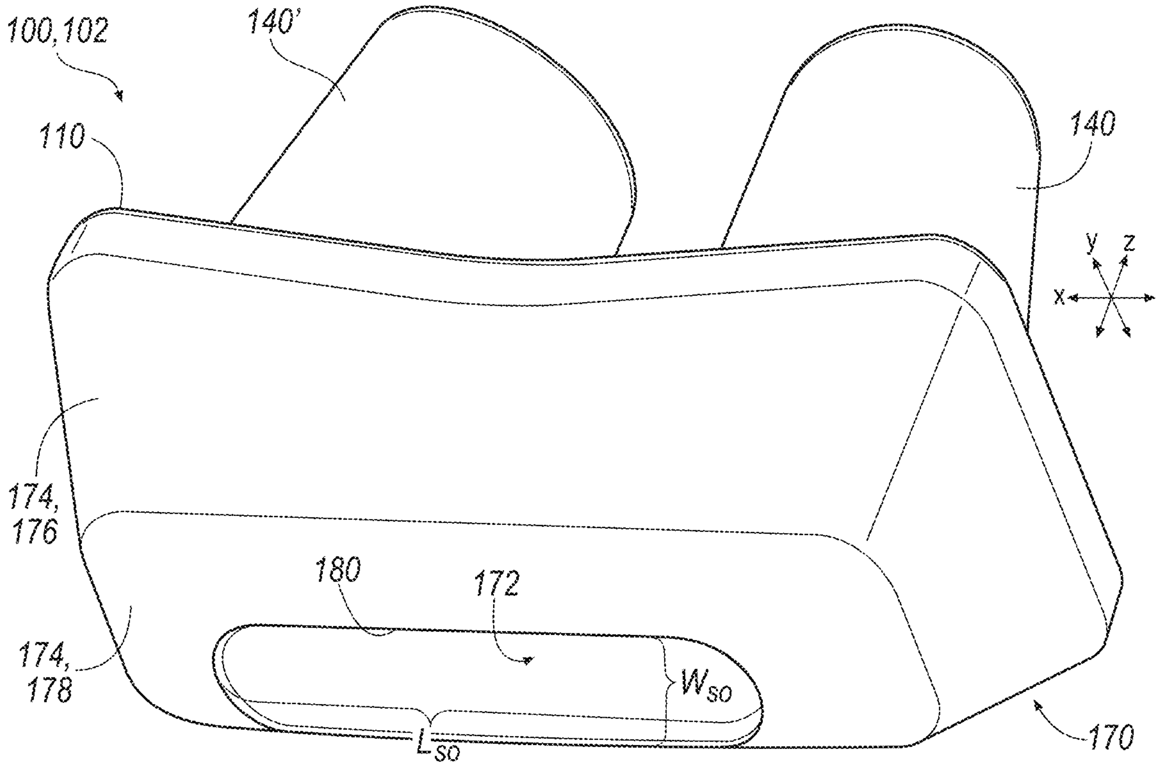
FIG. 4 is a perspective view of the exemplary nose plug of FIG. 1.
Figure 5A:
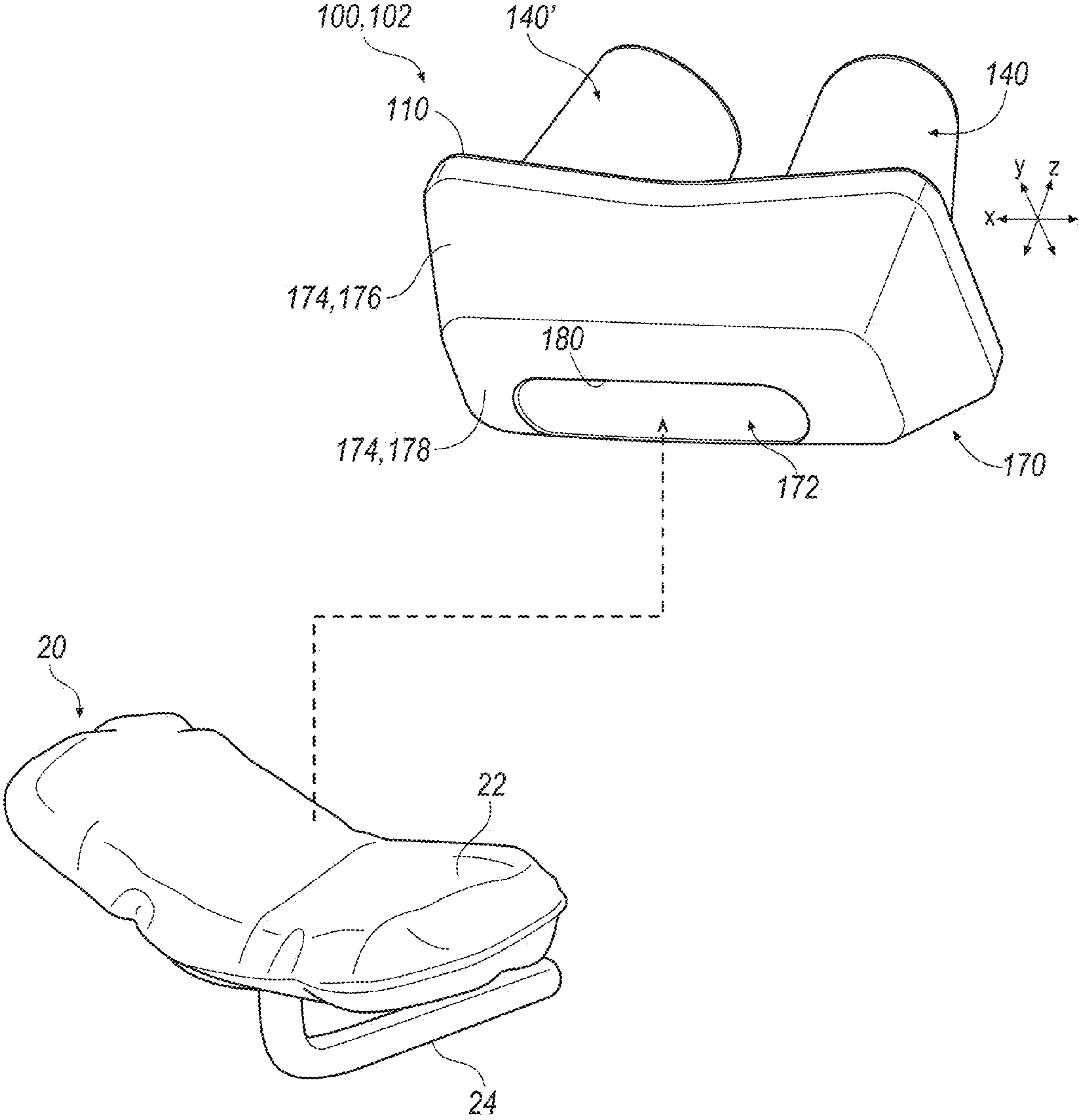
FIGS. 5A and 5B are perspective views showing the process of arranging, connecting, and/or mounting the exemplary nose plug of FIG. 1 on and/or to a nose clearing device.
Figure 5B:
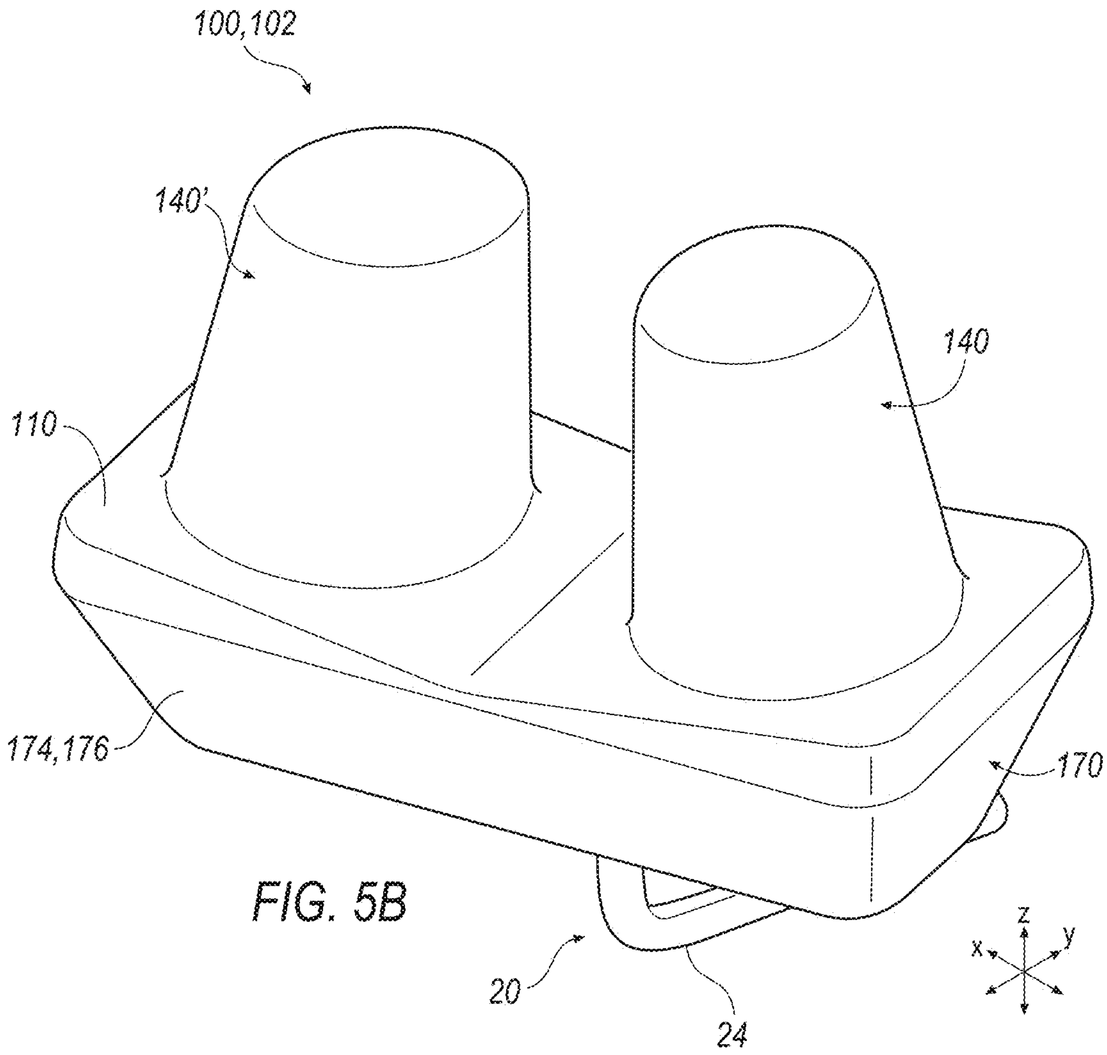

The exemplary nose plug 100 depicted in FIGS. 1-5B is structured as a nose plug attachment 102 that is attachable to and/or mountable on the nose block 22 of an NCD 20. The attachment formation 170 is disposed on and connected to (e.g., integrally formed with) the base 110. As generally illustrated in FIG. 4, the attachment formation 170 includes and/or is defined by a receptacle 172, an elastically deformable skirt 174, and a skirt opening 180. The receptacle 172 is configured to removably receive and retain at least a portion of the nose block 22. The receptacle 172 is defined at least partially by and between the base 110 and the skirt 174, and is shaped in a complimentary manner to the nose block 22. The nose block 22 is insertable into and removable from the receptacle 172 via the skirt opening 180 as depicted in FIGS. 5A and 5B. The skirt opening 180 is disposed in and defined by the skirt 174. The skirt opening 180 is smaller than the nose block 22 when in an unstretched state thereby restricting and/or preventing the nose block 22 from being inserted into and/or removed from the receptacle 172. For example, in the unstretched state depicted in FIG. 4, the skirt opening 180 is an elongated slot with a length $L_{so}$ of 1 inch extending in the X-direction and a width $W_{so}$ of 0.25 inches extending in the Y-direction. However, due to the properties of the material of the skirt 174, a user can stretch and/or elastically deform the skirt 174 to expand the size of the skirt opening 180 to enable the nose block 22 to pass through the skirt opening 180 for insertion into and/or removal from the receptacle 172. The skirt 174 includes one or more side walls 176 and a bottom wall 178. The skirt 174 and/or the walls 176, 178 thereof have a thickness of 0.1 to 0.2 inches (preferably, 0.13 inches and/or 0.15 inches). Optionally, the thickness of the skirt 174 and/or the walls 176, 178 is greater at or about the base 110 than it is at or about the skirt opening 180. In one such example, the skirt 174 and/or the walls 176, 178 have a thickness of 0.1 to 0.2 inches (preferably, 0.13 inches and/or 0.15 inches) at or about the skirt opening 180, and the thickness of the skirt 174 and/or the walls 176, 178 gradually increases (e.g., in a consistent manner) as the skirt 174 and/or the walls 176, 178 extend toward and/or approach the base 110. The skirt 174 and/or the side wall 176 extends around an outer perimeter of the base 110, which may be defined by the two width side surfaces and the two length side surfaces of the base 110. The skirt 174 and/or the side wall 176 also extends and/or projects from a side of the base 110 opposite the nasal inserts 140, 140'. The bottom wall 178 is disposed at, connected to, and projects from an end of the side wall 176 opposite the base 110. The bottom wall 178 extends and/or is oriented transversely (e.g., obliquely and/or perpendicularly) to the side wall 176 and at least partially closes the end of the receptacle 172 opposite the base 110. The skirt opening 180 is disposed in and defined by the bottom wall 178 of the skirt 174. When the nose block 22 is disposed in the receptacle 172, the skirt 174 extends and/or wraps around the nose block 22 and at least partially encloses the nose block 22 within the receptacle 172 thereby attaching, securing, and/or mounting the nose plug attachment 102 to the NCD 20.

In other examples, the attachment formation 170 is configured to engage the mounting shaft 24 of an NCD 20 to attach the nose plug 100 to the NCD 20. In such examples, the attachment formation 170 includes and/or is defined by a recess and one or more mechanical fasteners. The recess is disposed in and defined by the base 110, and is configured to removably receive at least a portion (e.g., an end) of the mounting shaft 24. The mechanical fastener (e.g., an internal thread and/or detent projection) is attached to the base 110 and configured to releasably engage a complimentary fastener of the mounting shaft 24 to attach and/or connect the nose plug 100 to the mounting shaft 24.

While the disclosed nose plug 100 has been described with respect to its use in connection with underwater diving, the nose plug 100 is not limited to use in connection with underwater diving. The nose plug 100 may conceivably be utilized in connection with any type of equipment, activity, and/or situation that may involve plugging a nose and/or sealing a nasal passage. For example, the nose plug 100 may be utilized to prevent dangerous substances and/or chemicals from entering the nose and/or being inhaled, to prevent water from entering the nose (e.g., while swimming, water skiing, etc.), to avoid experiencing an undesirable smell, among many other possible uses.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

All matter contained in the above description or shown in the accompanying drawings shall be interpreted as illustrative only and not limiting. Changes in detail or structure may be made without departing from the present disclosure.

What is claimed is:

1. A nose plug for performing a pressure equalization maneuver while underwater diving, comprising:
- a base connectable to a mating component of a diving helmet;
- an elastically deformable skirt projecting from the base;
- a receptacle defined by the base and the skirt;
- a skirt opening defined by the skirt and via which at least a portion of a nose block of a nose clearing device is insertable into the receptacle for releasably attaching the nose plug to the nose clearing device;
- a first nasal insert projecting from the base, the first nasal insert configured to protrude into and fit snuggly within a first nostril of a user when in use such that airflow through the first nostril is prevented; and
- a second nasal insert projecting from the base, the second nasal insert configured to protrude into and fit snuggly within a second nostril of the user when in use such that airflow through the second nostril is prevented.

2. The nose plug according to claim 1, wherein an external surface of the base includes a first angled region and a second angled region extending transversely to one another.

3. The nose plug according to claim 2, wherein:
- the first nasal insert is arranged on and projects from the first angled region of the external surface of the base; and
- the second nasal insert is arranged on and projects from the second angled region of the external surface of the base.

4. The nose plug according to claim 3, wherein the first angled region and the second angled region of the external surface are sloped downwardly toward a centerline of the base.

5. The nose plug according to claim 3, wherein an angle of 150°-170° is defined by and between the first angled region and the second angled region of the external surface of the base.

6. The nose plug according to claim 1, wherein the base, the first nostril insert, and the second nostril insert are composed of a deformable, non-porous rubber material that is resistant to changes in at least one of size, shape, and density due to forces present in at least one of an underwater environment and a diving environment.

7. The nose plug according to claim 1, wherein the first nasal insert and the second nasal insert are each a completely solid body that is free of a through passage.

8. The nose plug according to claim 1, wherein the first nasal insert and the second nasal insert each have an ellipse shaped cross-section.

9. The nose plug according to claim 8, wherein:
- the ellipse shaped cross-section of the first nasal insert has a first major axis and a first minor axis;
- the ellipse shaped cross-section of the second nasal insert has a second major axis and a second minor axis; and
- the first major axis and the second major axis extend transversely relative to one another.

10. The nose plug according to claim 9, wherein a 40°-60° angle is defined by and between the first major axis and the second major axis.

11. The nose plug according to claim 1, wherein the first nasal insert and the second nasal insert each include (i) a frustoconical portion and (ii) a dome portion disposed at a free end of the frustoconical portion.

12. The nose plug according to claim 1, wherein the first nasal insert and the second nasal insert each have a total height of 0.425 to 0.625 inches.

13. The nose plug according to claim 12, wherein, when in use, the first nasal insert and the second nasal insert are configured to project at least 0.2 inches into the first nostril and the second nostril, respectively.

14. The nose plug according to claim 1, wherein an angle of 10°-20° is defined by and between a first central longitudinal axis of the first nasal insert and a second central longitudinal axis of the second nasal insert.

15. The nose plug according to claim 1, wherein at least one of the first nasal insert and the second nasal insert has (i) a central longitudinal axis and (ii) an outer circumferential surface that extends at a 5°-15° angle relative to the central longitudinal axis.

16. The nose plug according to claim 1, wherein the skirt extends around an outer perimeter of the base and projects from a side of the base opposite the first nasal insert and the second nasal insert.

17. The nose plug according to claim 16, wherein:
- the skirt includes at least one side wall projecting from the base and a bottom wall projecting from an end of the at least one side wall opposite the base; and
- the skirt opening is an elongated slot disposed in and defined by the bottom wall of the skirt.

18. A nose clearing device for a diving helmet, comprising the nose plug according to claim 1.

19. A diving helmet, comprising the nose plug according to claim 1, wherein the nose plug is arranged within the diving helmet and is inaccessible to a hand of the user during a dive.

* * * * *